United States Patent
Tuma et al.

[11] Patent Number: 5,997,614
[45] Date of Patent: Dec. 7, 1999

[54] FILTER WITH DIFFUSION CHANNEL AND METHODS OF MAKING AND USING THE FILTER

[75] Inventors: Daniel L. Tuma; Randy J. Logan, both of St. Paul, Minn.; Andrew C. Dahlgren, Discovery Bay, The Hong Kong Special Administrative Region of the People's Republic of China

[73] Assignee: Donaldson Company, Inc., Minneapolis, Minn.

[21] Appl. No.: 09/114,801

[22] Filed: Jul. 13, 1998

[51] Int. Cl.⁶ .................................................... B01D 53/22
[52] U.S. Cl. ............................... 96/4; 55/385.6; 55/501; 55/524; 360/97.02
[58] Field of Search .................................... 55/385.6, 471, 55/467, 524, 502, 501; 360/97.02; 454/184; 96/14, 4

[56] References Cited

U.S. PATENT DOCUMENTS

| | | |
|---|---|---|
| 3,422,679 | 1/1969 | McGowan et al. . |
| 3,740,735 | 6/1973 | Gabor . |
| 3,822,601 | 7/1974 | Borom . |
| 4,329,722 | 5/1982 | West . |
| 4,350,508 | 9/1982 | Santoro et al. . |
| 4,657,570 | 4/1987 | Gronholz et al. . |
| 4,684,381 | 8/1987 | Wasylyniuk . |
| 4,684,510 | 8/1987 | Harkins . |
| 4,857,087 | 8/1989 | Bolton et al. . |
| 4,863,499 | 9/1989 | Osendorf . |
| 4,889,542 | 12/1989 | Hayes . |
| 4,957,518 | 9/1990 | Brassell . |
| 5,030,260 | 7/1991 | Beck et al. . |
| 5,108,474 | 4/1992 | Riedy et al. . |
| 5,124,856 | 6/1992 | Brown et al. . |
| 5,130,205 | 7/1992 | Vu et al. . |
| 5,163,870 | 11/1992 | Cooper . |
| 5,346,518 | 9/1994 | Baseman et al. . |
| 5,417,743 | 5/1995 | Dauber ........................................ 96/13 |
| 5,593,482 | 1/1997 | Dauber et al. ............................. 55/524 |

FOREIGN PATENT DOCUMENTS

| | | |
|---|---|---|
| 55-119418 | 9/1980 | Japan . |
| WO 91/14496 | 10/1991 | WIPO . |
| WO 95/19831 | 7/1995 | WIPO . |

*Primary Examiner*—David A. Simmons
*Assistant Examiner*—Robea A. Hopkins
*Attorney, Agent, or Firm*—Merchant & Gould P.C.

[57] ABSTRACT

A filter has a channel layer film defining a channel, a boundary layer mounted to at least a portion of the channel layer film and forming a non-adhesive boundary for the channel, and filter media disposed in fluid communication with the channel. The boundary layer typically includes a non-porous or semipermeable film. The filter is configured and arranged to provide for flow of at least a portion of a fluid along the channel and into the filter media. This filter can be used in a device as a filter over a vent in a housing of the device.

29 Claims, 8 Drawing Sheets

FILTER WITH DIFFUSION CHANNEL AND METHODS OF MAKING AND USING THE FILTER

FIELD OF THE INVENTION

The present invention is, in general, directed to filters and methods of making and using the filters, as well as assemblies having the filters. More particularly, the present invention relates to filters having diffusion channels and methods of making and using the filters, as well as assemblies having the filters.

BACKGROUND OF THE INVENTION

Filters are useful in a variety of contexts. For example, filters are often used in electrical or optical equipment. An air pressure differential between the interior and exterior of a housing containing the equipment can be produced as the electrical or optical equipment heats and cools. Often the housing includes a vent to allow air flow that equalizes the pressure. A filter is typically provided over the vent to reduce the flow of contaminants into and/or out of the housing.

Computer disk drives, and in particular, hard disk drives, are one example of a device that uses filters in this manner. Disk drives are sensitive to moisture, chemical contamination, and particulate contamination, particularly, as the drive heads become smaller and aerial densities increase. Chemical contaminants, such as hydrocarbons acid gases, can condense onto a disk and degrade the head/disk interface and/or corrode the heads. Particulate contaminants can lead to stiction and can cause read/write errors and head crashes.

A filter placed over a vent in a disk drive typically includes filter material that filters particles and contaminants from the air. To increase the lifetime of filter material, particularly adsorbent filter material, a long and narrow flow path is often provided within the walls of the housing or in a cover disposed against the housing so that air flows along the path, through the filter, and into the interior of the housing. This path is often referred to as a "diffusion channel". The presence of a diffusion channel can reduce the amount of chemical contaminants and moisture reaching the adsorbent material of the filter and/or the inside of the disk drive.

Conventionally, a diffusion channel in a base or cover of a housing is made by casting or stamping the channel in the base or cover. Both of these methods provide challenges for tool makers and are difficult to change. Another technique includes providing the diffusion channel in a plastic body that is then attached-to the housing. This requires additional plastic and takes up vital space in the drive. Thus, there is a need for new diffusion channel designs.

SUMMARY OF THE INVENTION

Generally, the present invention relates to filters having a diffusion channel formed in a layer of the filter. One embodiment is a filter having a channel layer film defining a channel, a boundary layer mounted on at least a portion of the channel layer film forming a non-adhesive boundary for the channel, and filter media disposed in fluid communication with the channel. The filter is configured and arranged for flow of at least a portion of a fluid along the channel and into the filter media. Unless otherwise indicated, fluid may also flow in the opposite direction. This filter can be used in a device as a filter mounted on a vent in a housing of the device.

Another embodiment is a filter having a channel layer film with mounting adhesive and lamination adhesive disposed on opposing sides of the channel layer film. A diffusion channel and a spaced-apart passageway are formed in the channel layer film, mounting adhesive, and lamination adhesive. The diffusion channel extends to a sidewall of the channel layer film to form an opening in the filter. A boundary layer is laminated to at least a portion of the channel layer film by the lamination adhesive. A portion of the boundary layer forms a non-adhesive boundary of the diffusion channel. The filter also includes filter media mounted between the boundary layer and the channel layer film, in fluid communication with the diffusion channel, and disposed over the passageway. The filter is configured and arranged to provide for flow of fluid along the diffusion channel, into the filter media, and through the passageway to exit the filter. Unless otherwise indicated, fluid may also flow in the opposite direction.

A further embodiment is a method for making a filter. A channel is formed in a channel layer film by removing a portion of the channel layer. A filter layer is disposed in fluid communication with the channel. A boundary layer is laminated to the channel layer film, a portion of the boundary layer forming a non-adhesive boundary to the channel.

The above summary of the present invention is not intended to describe each disclosed embodiment or every implementation of the present invention. The Figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout the several views, in which.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE PREFERRED EMBODIMENT

The present invention is believed to be applicable to filters and methods of making and using filters to filter a fluid, such as, for example, air or other gases. In particular, the present invention is directed to breather filters having diffusion channels and methods of making and using these breather filters. While the present invention may not be so limited, an appreciation of various aspects of the invention will be gained through a discussion of the examples provided below.

One conventional filter design, as disclosed in U.S. Pat. No. 5,417,743, includes a diffusion tube formed in a layer of a filter. This filter includes a first adhesive layer, a non-outgassing polymer film, and a second adhesive mounting layer. The filter also includes a filter layer disposed over the first adhesive layer. A diffusion tube is formed by making a large opening in the polymer film and the second adhesive mounting layer. A smaller opening is formed in the first adhesive layer and superimposed over the large opening. Air flows along the diffusion tube, through the smaller opening, and into the filter layer.

In the filter disclosed in U.S. Pat. No. 5,417,743, one surface of the diffusion tube is bounded by the first adhesive layer, and, in particular, by adhesive. The presence of adhesive over an entire surface of the diffusion channel presents a number of difficulties. The disclosure of U.S. Pat. No. 5,417,743 indicates that the film must not be too wide or too thin as the adhesive layer may come in contact with an opposing surface and occlude the diffusion tube. The disclosure also indicates that the adhesive should be a low out-gassing adhesive that passes ASTM E-595-84 with less than 1% total mass loss and 0.1% collected volatile condensable material. The possibility of occlusion of the diffusion channel and the large area of exposed adhesive produce limitations in design and can result in less than optimum operational efficiencies and reliability.

The filters of the present invention overcome these difficulties by a novel structure that includes much reduced exposure to adhesive within a diffusion channel. Moreover, the much reduced amount of adhesive within the diffusion channel of the present inventive filters means there is little chance of occlusion if the boundary layer of the filter briefly comes in contact with an opposing surface. In many embodiments, a filter configured according to the present invention can have improved efficiency and reliability over conventional filter designs, although this is not necessary to the invention.

Figure 1:
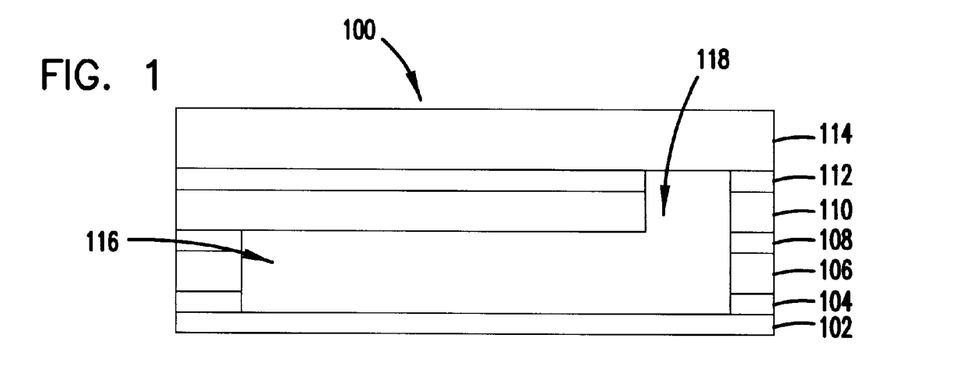
FIG. 1 is a cross-sectional view of one embodiment of a filter, according to the invention.
Figure 2:
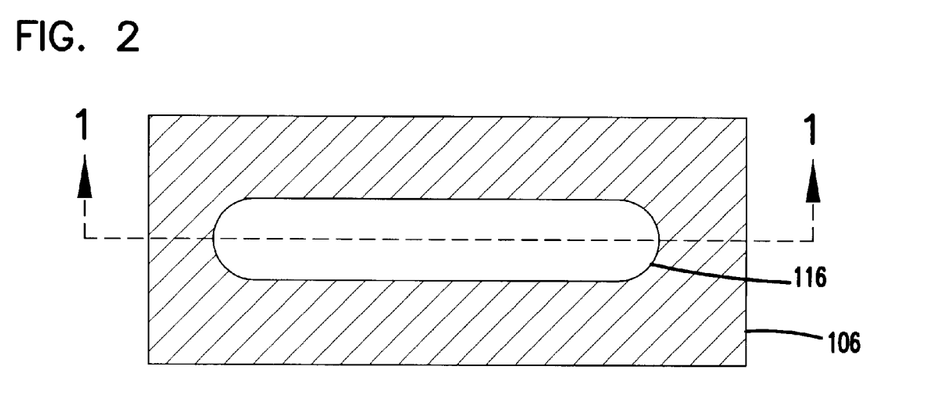
FIG. 2 is a plan view of a channel layer in the filter of FIG. 1.
Figure 3:
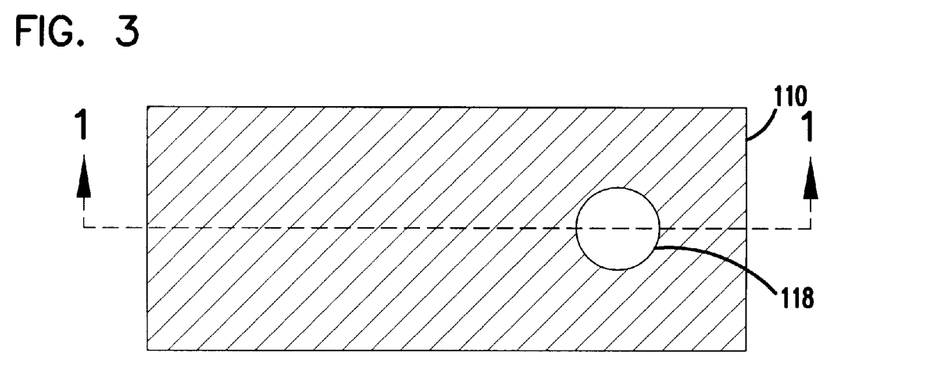
FIG. 3 is a plan view of a boundary layer in the filter of FIG. 1.
Figure 4:
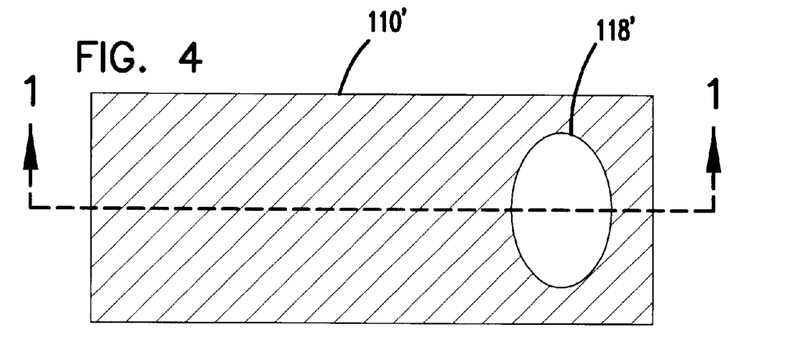
FIG. 4 is a plan view of an alternate boundary layer for use in the filter of FIG. 1.
Figure 5:
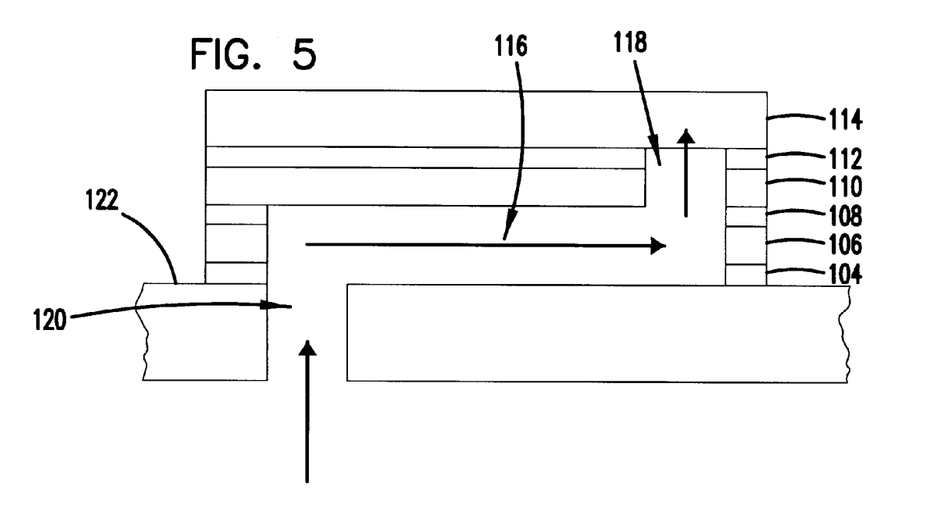
FIG. 5 is a cross-sectional view of the filter of FIG. 1 with the release liner removed and then placed over a port in a device, illustrating one path for fluid flow through the filter.

One example of a filter 100 of the present invention includes an optional release liner 102, mounting adhesive 104, a channel layer 106, lamination adhesive 108, a boundary layer 110, media lamination adhesive 112, and filter media 114, as shown in FIG. 1. A channel 116 is formed in the mounting adhesive 104, channel layer 106, and lamination adhesive 108. The channel can be formed by removing a portion of the mounting adhesive 104, channel layer 106 (as shown in FIG. 2), and lamination adhesive 108. A passageway 118 is formed through the boundary layer 110 (as shown in FIGS. 3 and 4) and media lamination adhesive 112 to permit fluid flow from the channel 116 into the filter media 114, as shown in FIG. 5 (with the release liner removed).

The mounting adhesive 104, lamination adhesive 108, and media lamination adhesive 112 may be the same or different. The adhesives 104, 108, and 112 are often a single layer of adhesive that is disposed on or applied to, for example, the channel layer 106, boundary layer 110, and/or filter media 114. These adhesives can be disposed on the appropriate layer by, for example, coating, painting, spraying, dipping, or otherwise applying the adhesive to the layer. In some embodiments, adhesive may be pre-applied on a commercially available film. The adhesives 104, 108, and 112 can also be double-sided adhesive films that include an adhesive carrier with adhesive disposed on both sides. The adhesive carrier is often a polymer film, such as, for example, a polyethylene, polypropylene, polyester, polycarbonate, polyurethane, or polyvinyl chloride film.

The adhesives 104, 108, and 112 can include permanent, semi-permanent, or temporary adhesives. The adhesive can be permeable to the fluid to be filtered or the adhesive can be non-permeable. Examples of suitable adhesives include epoxies, resins, pressure-sensitive adhesives, hot-melt adhesives, solvent-based adhesive, emulsion-based adhesives, and contact adhesives. One example of a suitable commercial adhesive is 3M 9461P adhesive from 3M Co. (St. Paul, Minn.). In some embodiments, other lamination techniques, such as heat lamination or sonic welding, may be used instead of one of more of the lamination adhesives 108 and 112.

In many embodiments, the adhesives 104, 108, and 112 include only low out-gassing adhesives. Out-gassing includes the release and/or production of gaseous or other contaminants by the adhesive. Out-gassing by an adhesive or other component of the filter can produce additional contaminants that are often introduced into the fluid and removed by the filter media 114. Contamination of the fluid by adhesive out-gassing can also be decreased by reducing, and, preferably, minimizing, the exposure of the fluid flowing through the filter 100 to the adhesives 104, 108, and 112. Often, adhesives are chosen which meet ASTM E-595-84 specifications with 1% or less total mass loss and 0.1% or less collected volatile condensable material. This, however, is not necessary to the invention.

Typically, the adhesives 104, 108, and 112 in the filter 100 have individual thicknesses that range from 10 $\mu$m to 150

μm, although thicker or thinner adhesives may be used. Often, the adhesives 104, 108, and 112 of the filter 100 have a thickness that ranges from 15 μm to 50 μm.

An optional release liner 102 (see FIG. 1) is used to protect the mounting adhesive 104 prior to use. Typically, the release liner 102 is formed of a material that can be separated from the mounting adhesive 104 without removing a substantial portion, and, preferably, without removing any, of the mounting adhesive 104 from the filter 100.

The channel layer 106 is typically formed using a polymer and/or metallic film. These films are often nonporous and have a low permeability to the fluid to be filtered, particularly, at the fluid pressures expected for operation of the filter 100. In many embodiments, the channel layer has a permeability to $N_2$ of $$1 \times 10^6 \; \frac{cm^3 \cdot mil}{100 \; in^2 \cdot 24 \; hr \cdot atm}$$

or less at 25° C., as determined according to ASTM D-1434-82. Preferably, the permeability to $N_2$ is $$1000 \; \frac{cm^3 \cdot mil}{100 \; in^2 \cdot 24 \; hr \cdot atm}$$

or less, more preferably, $$100 \; \frac{cm^3 \cdot mil}{100 \; in^2 \cdot 24 \; hr \cdot atm}$$

or less, and, most preferably, $$10 \; \frac{cm^3 \cdot mil}{100 \; in^2 \cdot 24 \; hr \cdot atm}$$

or less. Films with higher permeabilities can, however, be used.

Examples of suitable polymer films for use in the channel layer 106 include polyester (e.g., Mylar™), polyethylene, polypropylene, nylon, polycarbonate, polyvinyl chloride, and polyvinyl acetate films. Preferably, the polymer films have relatively low or no out-gassing.

Suitable metallic films for use in the channel layer 106 include films formed using metals, such as, for example, copper and aluminum, and alloys, such as, for example, stainless steel. Preferred metal films do not significantly corrode or form reaction products (e.g., rust) that can be dislodged from the film under the expected operating conditions of the filter. In some embodiments, the metallic film may be deposited or otherwise formed on a base material, such as, for example, a polymer film.

Typically, the thickness of the channel layer 106 ranges from, for example, 25 μm to 500 μm, however, thicker or thinner channel layers 106 can be used. In many embodiments, the thickness of the channel layer 106 ranges from 75 μm to 175 μm.

The boundary layer 110 is typically formed using a polymer and/or metallic film. The same materials used to form the channel layer 106 can be used to form the boundary layer 110. The boundary layer 110 is typically non-porous and has a low permeability to the fluid to be filtered. In many embodiments, the boundary layer has a permeability to $N_2$ of $$1 \times 10^6 \; \frac{cm^3 \cdot mil}{100 \; in^2 \cdot 24 \; hr \cdot atm}$$

or less at 25° C., as measured according to ASTM D-1434-82. Preferably, the permeability to $N_2$ is $$1000 \; \frac{cm^3 \cdot mil}{100 \; in^2 \cdot 24 \; hr \cdot atm}$$

or less, more preferably, $$100 \; \frac{cm^3 \cdot mil}{100 \; in^2 \cdot 24 \; hr \cdot atm}$$

or less, and, most preferably, $$10 \; \frac{cm^3 \cdot mil}{100 \; in^2 \cdot 24 \; hr \cdot atm}$$

or less. Films with higher permeabilities can, however, be used.

The boundary layer 110 of filter 100 forms one boundary surface for the channel 116. The boundary layer 110 prevents or restricts the flow of fluid through the boundary layer 110 and directs the flow of fluid along the channel 116 and through the passageway 118 defined by the boundary layer 110. The portion of the boundary layer 110 that forms a boundary surface for the channel 116 is substantially adhesive-free, resulting in a channel 116 that is substantially adhesive-free except for exposed edges of the mounting adhesive 104 and lamination adhesive 108. This reduces out-gassing and can prevent occlusion of the channel 116, which are concerns found in other filter designs. It will be understood that stray amounts of adhesive may be found in the channel 116, but overall the channel 116 is substantially adhesive-free.

Typically, the thickness of the boundary layer 110 ranges from, for example, 10 μm to 500 μm, however, thicker or thinner boundary layers 110 can be used. In many embodiments, the thickness of the boundary layer 110 ranges from 10 μm to 50 μm.

The filter media 114 may include a variety of materials. The filter media 114 may include one or more porous or microporous membranes, one or more types of adsorbent material, and/or other filtering elements. The filter media 114 may also include one or more support layers, such as woven or non-woven support scrims, and/or one or more porous films for containing material (e.g., particles, gels, or the like) used in the filter media 114.

A variety of porous and microporous membranes may be used in the filter media. The size of the pores in the membranes and the thickness of the membranes often determine, at least in part, the size of particles allowed through the membrane and/or filter. In addition, the membranes may adsorb contaminants within the fluid.

Often the porous or microporous membranes are formed from polymers. Examples of suitable porous or nicroporous membranes include porous or microporous polyethylene, polypropylene, nylon, polycarbonate, polyester, polyvinyl chloride, polytetrafluoroethylene (PTFE), and other polymeric membranes. One particularly suitable membrane is formed using expanded PTFE, which is described as having nodes and fibrils.

Adsorbent filter material may also be used. It will be understood that adsorbent filter material includes materials that adsorb and/or absorb contaminants by process, such as, for example, physisorption and/or chemisorption. The adsorbent filter material may include a single type of material or a combination of materials. The adsorbent filter material may remove a single contaminant or a number of contaminants. Examples of contaminants that may be removed include, for example, water, water vapor, chlorine, hydrogen sulfide, HCl, nitrogen dioxide, acid gases, and hydrocarbon compounds. Examples of suitable adsorbent filter materials include silica gel, molecular sieves, desiccating materials, carbon particles, activated carbon, $K_2CO_3$, and $Na_2CO_3$.

The adsorbent filter material may be in the form of, for example, particles, gels, sheets, webs, tablets, molded articles, or liquids, that are, preferably, held in place within the filter. The filter media 114 may contain a porous film around the adsorbent filter material to retain this material within the filter. Such porous films may include, for example, polyethylene, polypropylene, nylon, polycarbonate, polyester, polyvinyl chloride, polytetrafluoroethylene (PTFE), and other polymeric films. Alternatively, the other layers in the filter media 114 or filter 110 may act to retain the adsorbent filter material or the adsorbent filter material may be disposed on or within a polymer film.

The filter media 114 may also include one or more support layers, such as a support scrim, to support the porous or microporous membranes or to support the adsorbent filter material. Examples of such support layers include woven and non-woven films made from, for example, stretched or sintered plastics, such as polyesters, polypropylene, polyethylene, and polyamides (e.g., nylon). In some embodiments, the support layer may be porous and permit substantial cross-flow of fluid across the support layer and into other portions of the filter media 114.

One exemplary filter media includes an expanded polytetrafluoroethylene membrane, a porous, polymeric support scrim, and carbon adsorbent material. The expanded polytetrafluoroethylene membrane is mounted to the boundary layer by the media lamination adhesive. The support scrim is adhesively mounted on the expanded polytetrafluoroethylene membrane and the carbon adsorbent material is adhesively mounted on the support scrim. Other configurations of filter media can be formed using other combinations of layers.

The channel 116 can be formed, for example, by removing a portion of the mounting adhesive 104, the channel layer 106, and the lamination adhesive 108, as shown in FIG. 2. The portion of these layers can be, for example, die-cut or otherwise removed using, for example, a stamping apparatus or a rotary press. In one embodiment, the mounting adhesive 104 and the lamination adhesive 108 are simultaneously or sequentially applied to the channel layer 106. The mounting adhesive 104, the channel layer 106, and the lamination adhesive 108 are then cut to form the channel 116. By cutting these three layers the amount of adhesive in the channel is reduced to limit the exposure of the fluid to the adhesive 104 and 108. Alternatively, adhesives 104 and/or 108 can be coated on the channel layer 106 by a selective adhesive application technique or after cutting the portion of the channel layer 106 that is to form the channel 116.

The channel 116 may be formed as a straight or curved path. Alternatively, the channel 116 may be formed to have a more complex path, such as a winding path or a spiral path. The channel 116 may, in some embodiments, have two or more branches.

The channel has a thickness that typically corresponds to the combined thickness of the mounting adhesive 104, channel layer 106, and lamination adhesive 108. The width of the channel 116 can vary over a wide range. The width of the channel 116 ranges from, for example, 1 mm to 10 mm, although wider or narrower channels may be used. In some embodiments, the width of the channel 116 ranges from 1.5 to 5 mm. The width and thickness of the channel 116 may be chosen to balance the pressure drop of the filter 100 between the channel 116 and the filter media 114, although this is not necessary to the invention.

The passageway 118 is formed through the boundary layer 110 and media lamination adhesive 112, as shown in FIGS. 3 and 4, so that fluid can flow from the channel 116 into the passageway 118 and then into the filter media 114. Often the passageway 118 is formed over an end or near an end of the channel 116 to provide a longer path for the fluid through the channel 116. The passageway 118 may have the same width as the channel 116, as shown in FIG. 3, or the passageway may be wider or narrower. In alternative embodiments, a passageway 118' is formed in a boundary layer 110' so that the passageway 118' extends beyond the channel, as shown in FIG. 4. This may expose more of the filter media to the fluid.

The passageway 118 can be formed by die-cutting or otherwise cutting or removing a portion of the boundary layer 110 and media lamination adhesive 112. In some embodiments, the mounting adhesive 104, channel layer 106, and lamination adhesive 108 are also cut when the passageway 118 is formed.

In other embodiments, as illustrated in FIG. 4, only a portion of the passageway 118 overlaps the channel 116. The mounting adhesive 104, channel layer 106, and lamination adhesive 108 are not cut in this case, so that fluid from the channel 116 flows into the passageway 118' and expands to fill the larger cross-sectional area. In some of these embodiments, the cross-sectional area of the passageway 118' in the plane of the boundary layer 110' is larger than the cross-sectional area of the channel 116 in the plane of the channel layer 106.

In operation, the filter 100 (with the release liner 102 removed) is placed over a port 120 formed through a surface 122 of a housing or casing of a device, as shown in FIG. 5. The port 120 is aligned with a portion of the channel 116 so that air can flow through the port 120 and into the channel 116. Although the port 120 can be aligned anywhere along the channel 116, it is often preferable to align the port 120 at an end of the channel 116 opposite the passageway 118 to increase the distance that the fluid travels along the channel 116.

In some embodiments (not shown), the device may have a surface with two or more ports. The filter may be aligned with one or more of these ports. In some embodiments, the filter may have two or more channels (for example, one channel for alignment with each of the ports) and/or one or more passageways.

As an example of operation, a device, such as a disk drive, includes electronic or other components in a housing. The housing has a port through which air (or another fluid, such as nitrogen or helium) can flow. The filter 100 is typically placed on the interior of the housing over the vent to filter air flowing into the housing. Air flows through the port 120, along the channel 116, through the passageway 118, into the filter media 114, and out into the interior of the housing. Although, air flow is indicated in a particular direction, it will be understood that air also flows along a reversed path to exit the interior of the housing. In addition, air within the housing may also be circulated through the filter media 114. Alternatively, the filter 100 can also be used on the exterior of the housing, particularly if air from the interior of the housing is to be filtered prior to leaving the housing.

Figure 6:
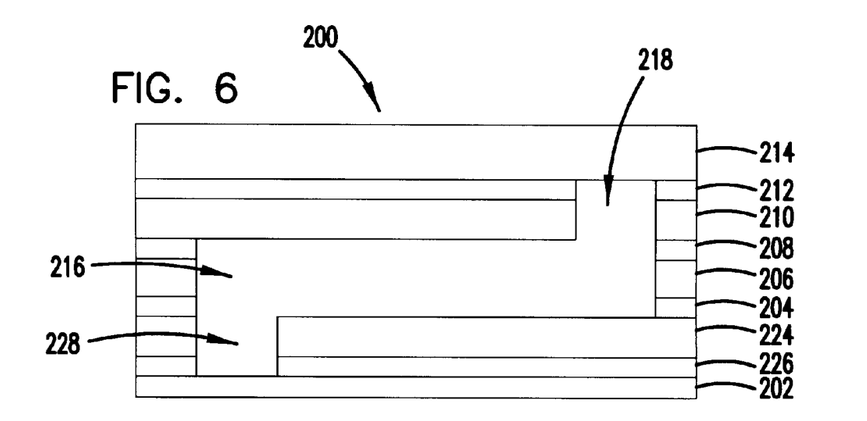
FIG. 6 is a cross-sectional view of another embodiment of a filter, according to the invention.

Another embodiment of a filter 200 includes an optional release liner 202, mounting adhesive 226, mounting layer 224, mounting layer lamination adhesive 204, channel layer 206, lamination adhesive 208, boundary layer 210, media lamination adhesive 212, and filter media 214, as shown in FIG. 6. The mounting layer 224 and mounting adhesive 226 include an opening 228 that can be aligned with a vent in a housing. A channel 216 is formed through the mounting layer lamination adhesive 204, channel layer 206, and lamination adhesive 208. A passageway 218 is formed through the boundary layer 210 and media lamination adhesive 212. The mounting layer 224, channel layer 206, and boundary layer 210 are typically formed using any of the same materials as the channel layer 106 and the boundary layer 110 of the embodiment illustrated in FIG. 1. The mounting adhesive 226, mounting layer lamination adhesive 204, lamination adhesive 208, and media lamination adhesive 212 can include any of the same materials as the mounting adhesive 104, lamination adhesive 108, and media lamination adhesive 112 of the embodiment illustrated in FIG. 1. The filter media 214 is typically formed using any of the materials that can be used for the filter media 114 of the embodiment illustrated in FIG. 1.

Typically, the opening 228 in the mounting layer 224 and mounting adhesive 226 is formed by die-cutting or otherwise cutting or removing a portion of the mounting layer 224 and mounting adhesive 226. Optionally, the mounting layer lamination adhesive 204, channel layer 206, and lamination adhesive 208 can also be cut with the mounting layer 224 and mounting adhesive 226.

Typically, the mounting layer 224 and mounting adhesive 226 are attached to the mounting layer lamination adhesive 204 after the channel 216 has been cut. However, in some cases, the channel 216 can be subsequently cut if the cutting tool does not cut through the mounting layer 224 and mounting adhesive 226.

Figure 7:
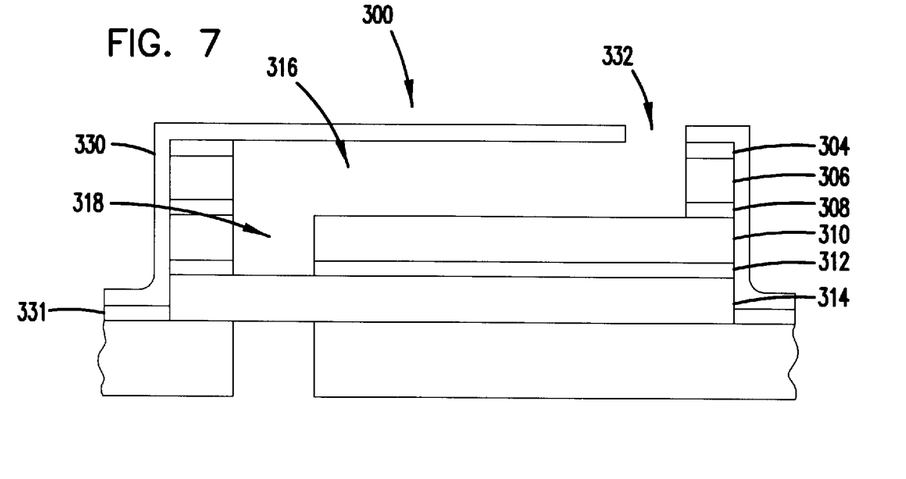
FIG. 7 is a cross-sectional view of a third embodiment of a filter, according to the invention.

Yet another embodiment of a filter 300 of the invention is illustrated in FIG. 7. This embodiment is particularly useful for placement on the outside of a housing of a device for filtering a fluid entering the housing. The filter 300 includes filter media 314, media lamination adhesive 312, a boundary layer 310, lamination adhesive 308, a channel layer 306, cover lamination adhesive 304, a cover 330, and mounting adhesive 331. A channel 316 is formed through the cover lamination adhesive 304, channel layer 306, and lamination adhesive 308. A passageway 318 is formed through the boundary layer 310 and media lamination adhesive 312. The channel layer 306 and boundary layer 310 are typically formed using any of the same materials as the channel layer 106 and the boundary layer 110 of the embodiment illustrated in FIG. 1. The mounting adhesive 331, cover lamination adhesive 304, lamination adhesive 308, and media lamination adhesive 312 can include any of the same materials as the mounting adhesive 104, lamination adhesive 108, and media lamination adhesive 112 of the embodiment illustrated in FIG. 1. The filter media 314 is typically formed using any of the materials that can be used for the filter media 114 of the embodiment illustrated in FIG. 1.

The exterior cover layer 330 is applied over the other layers to prevent or restrict the flow of a fluid into or out of the filter 300 other than through an opening 332 in the cover layer 330 or through the filter media 314. The cover layer 330 is typically made using any of the materials that can be used for the channel layer 106 or boundary layer 110 of the embodiment illustrated in FIG. 1. The mounting adhesive 331 may be formed on the cover layer 330, and, preferably, around the periphery of the cover layer 330.

In an alternative embodiment (not shown), the mounting adhesive may be spread across the filter media and/or the portion of the cover layer extending beyond the filter media. In this embodiment, the mounting adhesive is typically permeable and/or a portion of the filter media is exposed either by removal of the mounting adhesive 331 over that portion or by not coating that portion with mounting adhesive.

Figure 8:
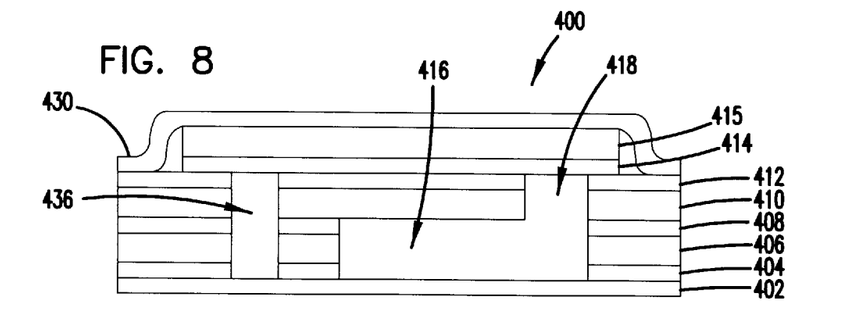
FIG. 8 is a cross-sectional view of a fourth embodiment of a filter, according to the invention.
Figure 9:
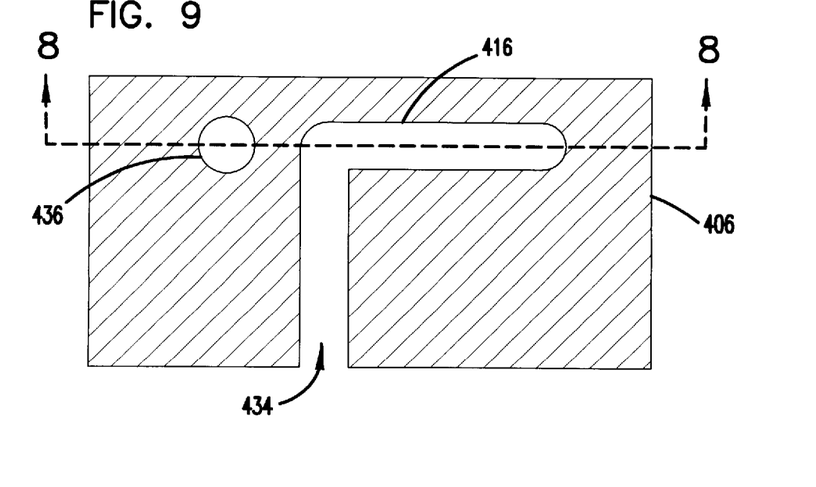
FIG. 9 is a plan view of a channel layer of the filter of FIG. 8.

Another embodiment of a filter 400 of the invention has a side inlet/outlet 434 for fluid, as illustrated in FIGS. 8 and 9. The filter 400 includes an optional release liner 402, mounting adhesive 404, a channel layer 406, lamination adhesive 408, a boundary layer 410, media lamination adhesive 412, filter media 414, a porous layer 415, and a cover layer 430. A channel 416 is formed in the mounting adhesive 404, channel layer 406, and lamination adhesive 408. The channel can be formed, for example, by removing a portion of the mounting adhesive 404, channel layer 406, and lamination adhesive 408, as shown in FIG. 9. The channel extends to an edge of the channel layer 406 to provide one or more side inlets/outlets 434. A passageway 418 is formed in the boundary layer 410 and media lamination adhesive 412 to permit fluid flow from the channel 416 into the filter media 414 and/or porous layer 415. An outlet/inlet passageway 436 is formed through the media lamination adhesive 412, boundary layer 410, lamination adhesive 408, channel layer 406, and mounting adhesive 404.

The channel layer 406, boundary layer 410, and cover layer 430 are typically formed using any of the same materials as the channel layer 106 and the boundary layer 110 of the embodiment illustrated in FIG. 1. The mounting adhesive 404, lamination adhesive 408, and media lamination adhesive 412 can include any of the same materials as the mounting adhesive 104, lamination adhesive 108, and media lamination adhesive 112 of the embodiment illustrated in FIG. 1. The filter media 414 is typically formed using any of the materials that can be used for the filter media 114 of the embodiment illustrated in FIG. 1.

Figure 10:
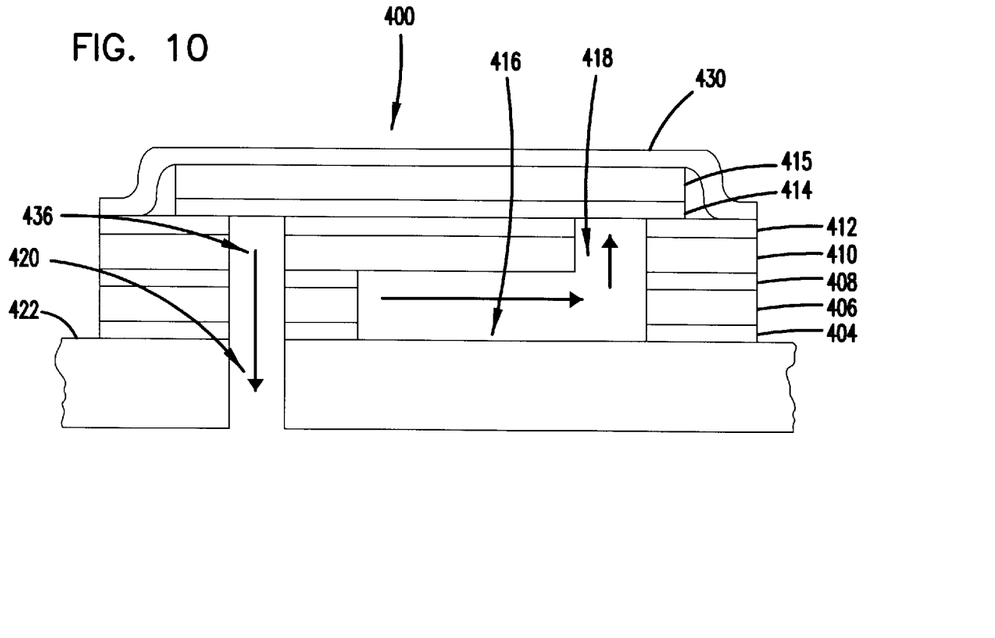
FIG. 10 is a cross-sectional view of the filter of FIG. 9 with the release liner removed and then placed over a port in a device, illustrating one path for fluid flow through the filter.

In operation, fluid flows into the filter through one or more side inlets/outlets 434, along the channel 416, through the passageway 418, into the filter media 414, along the outlet/inlet passageway 436, and through a port 420 in a surface 422 of a device, as shown in FIG. 10. It will be appreciated that fluid can also flow in the opposite direction.

The porous layer 415 may include a support layer (e.g., a woven or non-woven support scrim) that allows for cross-flow of fluid to facilitate the flow of fluid to the outlet/inlet passageway 436. This porous layer is typically not placed next to the media lamination adhesive 412 so that, at least in some embodiments, the fluid flows through one or more layers of filter media 414 before cross-flow through the porous layer 415 and/or before flow into the outlet/inlet passageway 436. In some embodiments, a porous layer 415 is not used, particularly, if the filter media is porous and allows sufficient fluid flow.

Figure 11:
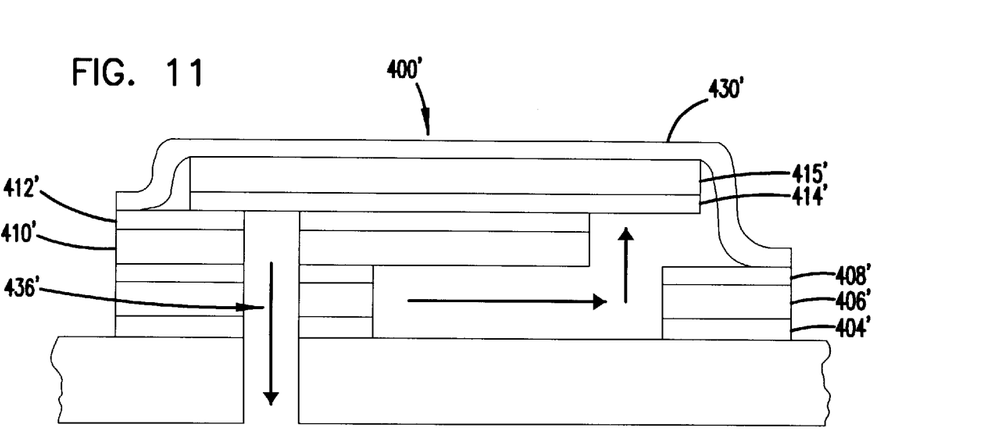
FIG. 11 is a cross-sectional view of a fifth embodiment of a filter, according to the invention.

Another version of this filter 400' is illustrated in FIG. 11, where it will be understood that elements designated with a prime represent analogous parts to those positively described with respect to a prior embodiment of the invention. In filter 400', the boundary layer 410' and media lamination adhesive 412' do not extend around and beyond the passageway 418'. This is an alternative method for defining the passageway 418'. The boundary layer 410' and media lamination adhesive 412' in this embodiment only extend over a portion of the filter 400'. In this embodiment a portion (not shown) of the filter media 414' and/or porous layer 415' may be attached to the channel layer 406' by the lamination adhesive 408'. This method of defining the passageway can also be used in any of the filter embodiments illustrated in FIGS. 1–10.

Figure 12:
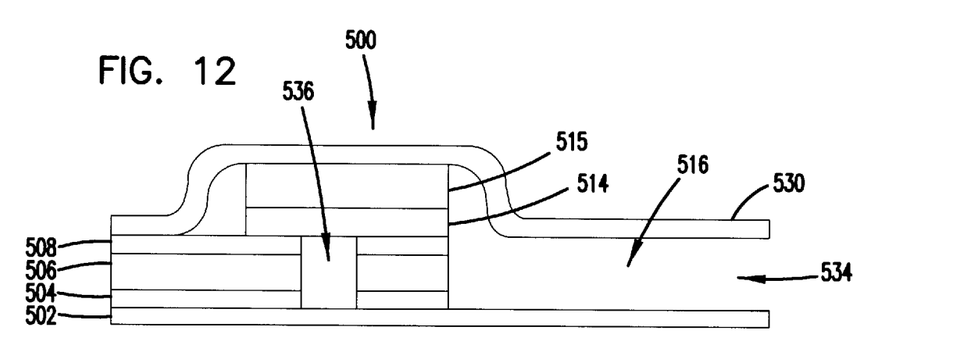
FIG. 12 is a cross-sectional view of an alternate embodiment of the filter of FIG. 9, according to the invention.
Figure 13:
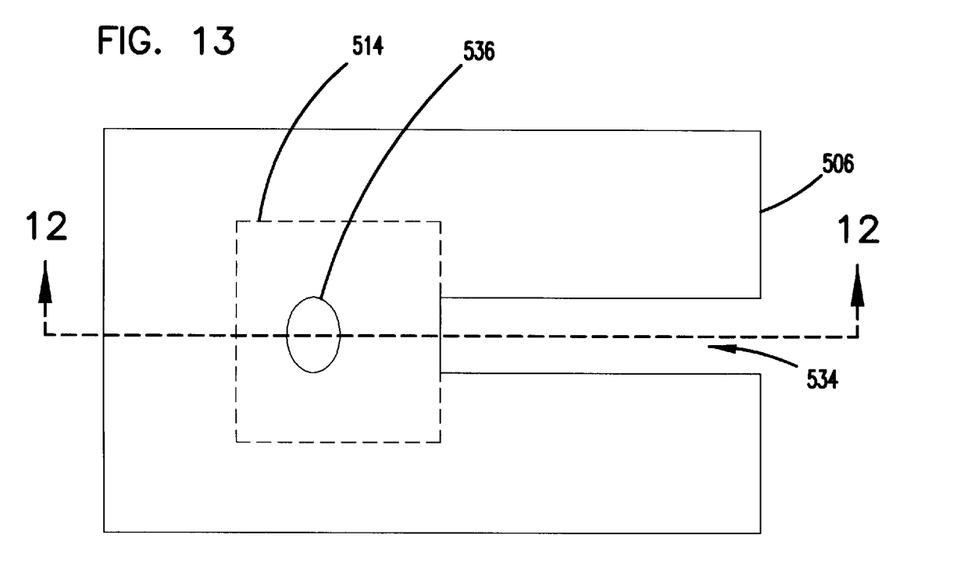
FIG. 13 is a plan view of a channel layer of the filter of FIG. 12.

Another embodiment of a filter 500 of the present invention is illustrated in FIGS. 12 and 13. The filter 500 includes an optional release liner 502, mounting adhesive 504, a channel layer 506, lamination adhesive 508, filter media 514, a porous layer 515, and cover layer 530. A channel 516 is formed in the mounting adhesive 504, channel layer 506, and lamination adhesive 508. The channel can be formed, for example, by removing a portion of the mounting adhesive 504, channel layer 506, and lamination adhesive 508, as shown in FIG. 13. The channel extends to an edge of the channel layer 506 to provide one or more side inlets/outlets 534. An outlet/inlet passageway 536 is formed through the lamination adhesive 508, channel layer 506, and mounting adhesive 504. Typically, the filter media 514 and porous layer 515 extend over only a portion of the filter 500 and in particular, the filter media 514 is disposed over the outlet/inlet passageway 536, as illustrated in FIG. 13.

The channel layer 506 and cover layer 530 are typically formed using any of the same materials as the channel layer 106 and the boundary layer 110 of the embodiment illustrated in FIG. 1. The mounting adhesive 504 and lamination adhesive 508 can include any of the same materials as the mounting adhesive 104, lamination adhesive 108, and media lamination adhesive 112 of the embodiment illustrated in FIG. 1.

The filter media 514 is typically formed using any of the materials that can be used for the filter media 114 of the embodiment illustrated in FIG. 1. The porous layer 515 is typically formed using a polymer screen or a porous, woven or non-woven, polymeric material made from, for example, stretched or sintered plastics, such as polyesters, polypropylene, polyethylene, and polyamides (e.g., nylon). Preferably, the porous support layer 515 allows for cross-flow of fluid between the channel 516 and the filter media 514. In some embodiments, a porous layer 515 is not used, particularly, if the filter media 514 is porous and allows sufficient fluid flow.

In the filter 500, the filter media 514 extends across only a portion of the filter 500. The filter media 514 and porous layer 515 may be flush with the channel 516, extend over a portion of the channel 516, or be slightly pulled away from the channel 516. An advantage of this configuration may include a savings on material costs because the filter media does not fully extend across the filter 500.

At least a portion of the channel 516 is formed along the region of the filter 500 that is not covered by the filter media 514 and porous layer 515. The cover layer 530 acts as a boundary layer over the channel 516. In the region of the filter 500 not covered by the filter media 514, the cover layer 530 is attached to the channel layer 506 via the lamination adhesive 508, as shown in FIGS. 12 and 13. Typically, there is a region of open space between the cover layer 530 and the edge of filter media 514 and support layer 515 to allow fluid to flow from the channel 516 into the filter media 514 and/or porous layer 515.

Figure 14:
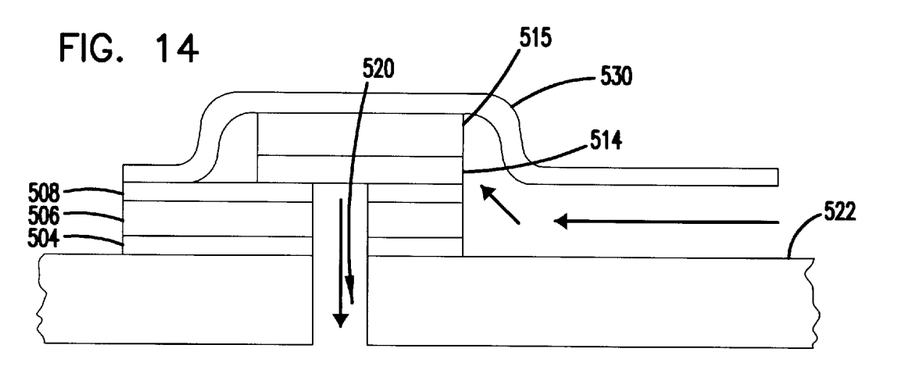
FIG. 14 is a cross-sectional view of the filter of FIG. 12 with the release liner removed and then placed over a port on an exterior surface of a device, illustrating one exemplary path for fluid flow through the filter.
Figure 15:
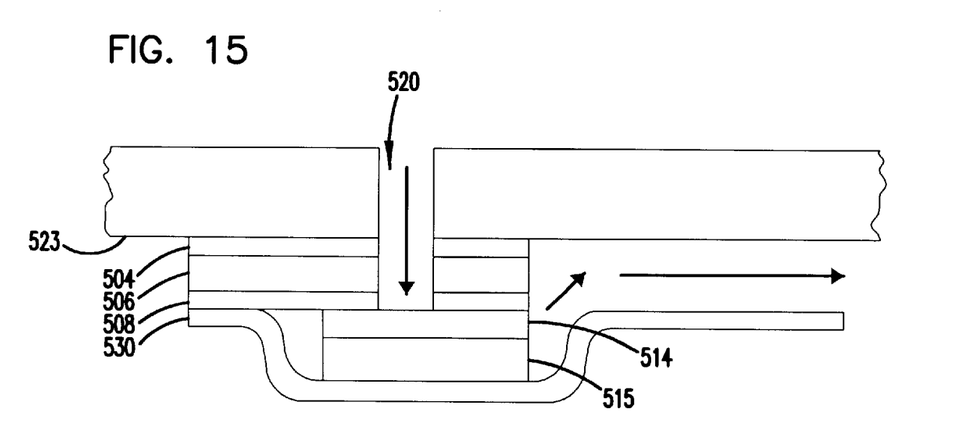
FIG. 15 is a cross-sectional view of the filter of FIG. 12 with the release liner removed and then placed over a port on an interior surface of a device, illustrating another exemplary path for fluid flow through the filter.

FIGS. 14 and 15 illustrate exemplary attachments of the filter 500 to an exterior surface 522 and interior surface 523, respectively, of a housing. One exemplary attachment to an exterior surface 522 of a device allows fluid from the exterior of the housing to flow into the side inlet/outlet 534, along the channel 516, into the open space between the cover layer 530 and the filter media 514 and optional support layer 515, through the filter media 514, along the outlet/inlet passageway 536, and through a port 520 in the housing, as illustrated in FIG. 14. In this embodiment, fluid from the exterior of the housing flows, first, through the channel 516 and, then, through the filter media 514. Fluid from the interior of the housing flows in the opposite direction.

An alternative attachment of the filter 500 is to an interior surface 523 of the housing so that fluid flows, first, through the filter media 514 and then through the channel 516, as shown in FIG. 15. In this embodiment, fluid from the exterior of the housing flows through a port 520 in the housing, along the outlet/inlet passageway 534, through the filter media 514, into the open space between the cover layer 530 and the edge of the filter media 514 and optional support layer 515, along the channel 516, and through the side inlet/outlet 534. Fluid from the interior of the housing flows in the opposite direction. It will be understood that other attachments of the filter 500 to the exterior surface or interior surface of a housing can also be used.

Other embodiments of filters of the invention can be made with the boundary layer being formed using a semipermeable film, and in particular, a porous or microporous membrane that filters a fluid flowing through the filter. The semipermeable film is typically at least one order of magnitude more porous than the boundary layer 110 described for the filter 100 of FIG. 1. It is thought, although no theory is necessary to the invention, that much of the fluid flows through the passageway defined by the semipermeable boundary layer and not through the semipermeable film, thereby, providing a diffusion channel effect. For a variety of applications, a boundary layer formed using a semipermeable film may provide adequate filtering. It will be recognized, however, that the previously described embodiments with a boundary layer having a low permeability to the fluid are likely to provide better filtering as there is often reduced flow through the boundary layer to increase the average distance that fluid flows through the channel.

Figure 16:
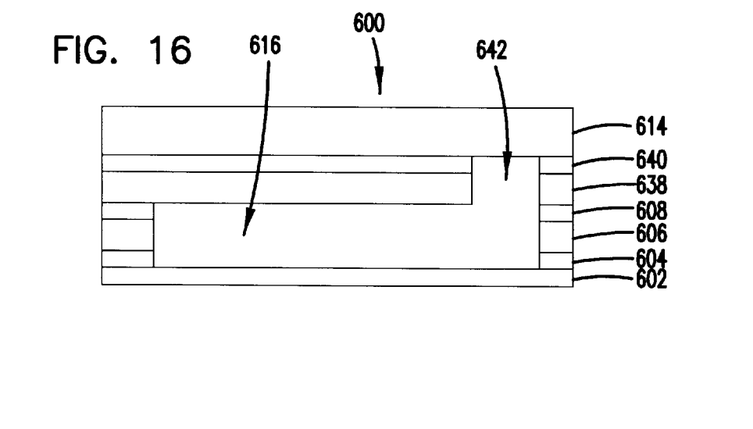
FIG. 16 is a cross-sectional view of a sixth embodiment of a filter, according to the invention.

One embodiment of a filter 600 of the invention includes an optional release liner 602, mounting adhesive 604, channel layer 606, lamination adhesive 608, semipermeable boundary layer 638, optional support layer 640 (and/or media lamination adhesive), and filter media 614, as shown in FIG. 16. A channel 616 is formed in the mounting adhesive 604, channel layer 606, and lamination adhesive 608. A passageway 642 is formed in the semipermeable boundary layer 638 and optional support layer 640. The channel layer 606 is typically formed using any of the same materials as the channel layer 106 and the boundary layer 110 of the embodiment illustrated in FIG. 1. The mounting adhesive 604 and lamination adhesive 608 can include any of the same materials as the mounting adhesive 104, lamination adhesive 108, and media lamination adhesive 112 of the embodiment illustrated in FIG. 1. The filter media 614 is typically formed using any of the materials that can be used for the filter media 114 of the embodiment illustrated in FIG. 1.

The semipermeable boundary layer 638 is typically a porous or microporous membrane. Examples of suitable porous or microporous membranes include porous or microporous polyethylene, polypropylene, nylon, polycarbonate, polyester, polyvinyl chloride, polytetrafluoroethylene (PTFE), and other polymeric membranes. One particularly suitable membrane for use in the semipermeable boundary layer 638 is formed using expanded PTFE which is described as having nodes and fibrils.

Typically, the thickness of the semipermeable boundary layer 638 ranges from, for example, 25 $\mu$m to 500 $\mu$m, however, thicker or thinner semipermeable boundary layers 638 can be used. In many embodiments, the thickness of the semipermeable boundary layer 638 ranges from 25 μm to 125 μm. Typically, the semipermeable boundary layer 638 is less permeable than the filter media 614.

The support layer 640 can be, for example, a support scrim, to support the semipermeable boundary layer 638. Examples of such support layers include woven and nonwoven films made from, for example, stretched or sintered plastics, such as polyesters, polypropylene, polyethylene, and polyamides (e.g., nylon).

Figure 17:
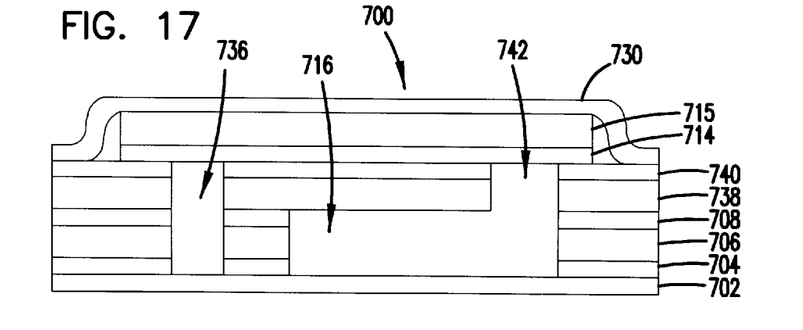
FIG. 17 is a cross-sectional view of a seventh embodiment of a filter, according to the invention.
Figure 18:
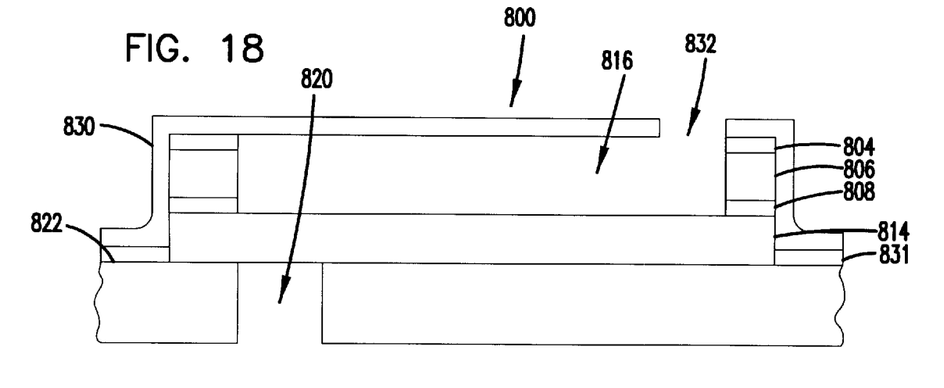
FIG. 18 is a cross-sectional view of a eighth embodiment of a filter, according to the invention.

Another embodiment of a filter 700 of the invention includes an optional release liner 702, mounting adhesive 704, channel layer 706, lamination adhesive 708, semipermeable boundary layer 738, optional support layer 740 (and/or media lamination adhesive), filter media 714, porous layer 715, and cover layer 730, as shown in FIG. 17. A channel 716 is formed in the mounting adhesive 704, channel layer 706, and lamination adhesive 708. The channel 716 extends to an edge of the filter 700 to provide a side inlet/outlet 734, as shown, for example, in FIG. 9. A passageway 742 is formed in the semipermeable boundary layer 738 and optional support layer 740. An outlet/inlet passageway is formed in the lamination adhesive 708, channel layer 706, and mounting adhesive 704.

The channel layer 706 and cover layer 730 are typically formed using any of the same materials as the channel layer 106 and the boundary layer 110 of the embodiment illustrated in FIG. 1. The mounting adhesive 704, lamination adhesive 708, and media lamination adhesive 712 can include any of the same materials as the mounting adhesive 104, lamination adhesive 108, and media lamination adhesive 112 of the embodiment illustrated in FIG. 1. The filter media 714 is typically formed using any of the materials that can be used for the filter media 114 of the embodiment illustrated in FIG. 1.

The semipermeable layer 738 and support layer 740 are formed using the same materials as the semipermeable layer 638 and support layer 640 of the embodiment illustrated in FIG. 14. Typically, the porous layer 715 allows for crossflow of fluid to facilitate the flow of fluid from the passageway 718 to the outlet/inlet passageway 736. In some embodiments, a porous layer 715 is not used, particularly, if the filter media 714 is porous and allows sufficient fluid flow. This porous layer 715 is typically not placed next to the support layer 740 so that the fluid flows through one or more layers of filter media 714 before cross-flow through the porous layer 715.

Another embodiment of a filter 800 is illustrate in FIG. 17. The filter 800 includes filter media 814, lamination adhesive 808, channel layer 806, cover lamination adhesive 804, cover layer 830, and mounting adhesive 831. A portion of the cover lamination adhesive 804, cover layer 806, and lamination adhesive 808 is removed to form a channel 816. One or more openings 832 are formed in the cover layer 830 to allow air into and out of the filter 800.

In this embodiment, a surface 822 of a device acts as a boundary layer for the channel 816. The filter 800 is positioned so that some portion of the filter media 814 is over a port 820 in the surface 822. Preferably, the filter 800 is positioned so that the port 820 is disposed on an opposite side of the filter 800 from the opening 832.

The channel layer 806 and cover layer 830 are typically formed using any of the same materials as the channel layer 106 and the boundary layer 110 of the embodiment illustrated in FIG. 1. The mounting adhesive 831, lamination adhesive 808, and cover lamination adhesive 804 can include any of the same materials as the mounting adhesive 104, lamination adhesive 108, and media lamination adhesive 112 of the embodiment illustrated in FIG. 1. The filter media 814 is typically formed using any of the materials that can be used for the filter media 114 of the embodiment illustrated in FIG. 1.

Figure 19:
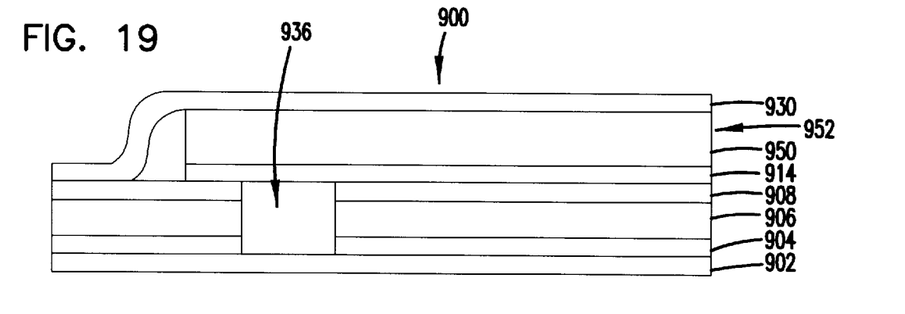
FIG. 19 is a cross-sectional view of a ninth embodiment of a filter, according to the invention.
Figure 20:
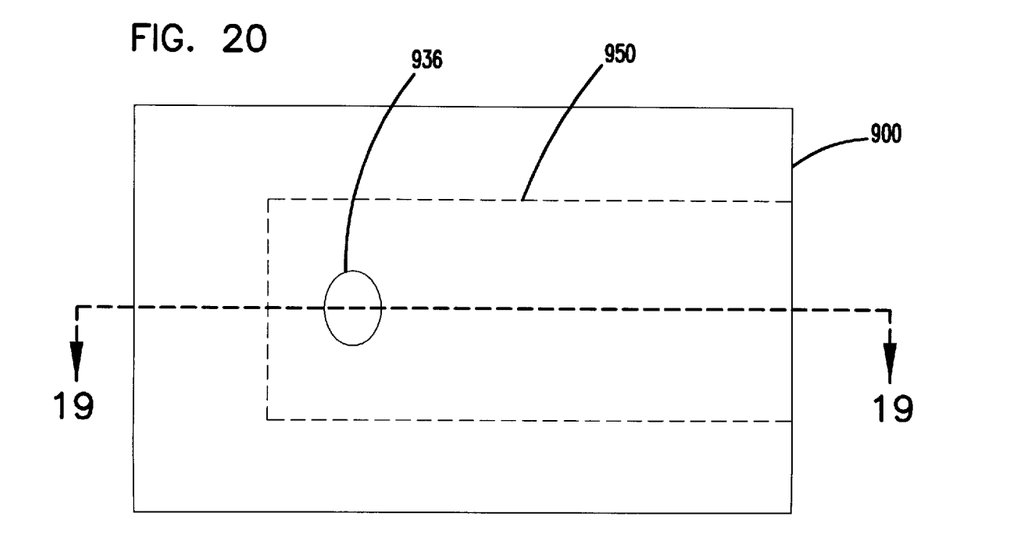
FIG. 20 is a bottom plan view of the filter of FIG. 19 with the optional release liner removed.

FIGS. 19 and 20 illustrate yet another filter 900 in which a porous layer 950 forms the diffusion channel. The filter 900 includes an optional release liner 902, mounting adhesive 904, polymer film layer 906, lamination adhesive 908, filter media 914, porous layer 950, and cover layer 930. The porous layer 950 extends to an edge 952 of the filter. An inlet/outlet passageway 936 is formed through the mounting adhesive 904, polymer film layer 906, and lamination adhesive 908. Air flows into the inlet/outlet passageway 936, through the filter media 914, along the porous layer 950 to exit through an edge 952 of the porous layer. It will be understood that air can also flow in the opposite direction.

The polymer layer 906 and cover layer 930 are typically formed using any of the same materials as the channel layer 106 and the boundary layer 110 of the embodiment illustrated in FIG. 1. The mounting adhesive 904 and lamination adhesive 908 can include any of the same materials as the mounting adhesive 104, lamination adhesive 108, and media lamination adhesive 112 of the embodiment illustrated in FIG. 1. The filter media 914 is typically formed using any of the materials that can be used for the filter media 114 of the embodiment illustrated in FIG. 1. The porous layer 950 can be a polymer screen or a woven or non-woven polymeric material made from, for example, stretched or sintered plastics, such as polyesters, polypropylene, polyethylene, and polyamides (e.g., nylon).

The filter media 914 and porous layer 950 often do not cover the entire filter. This allows cover layer 930 to be adhered to the polymer film 906 by the lamination adhesive 908 on three sides of the porous layer 950. Typically, the porous layer 950 is laminated, typically either by heat or permeable adhesive, to the filter media 914.

Figure 21:
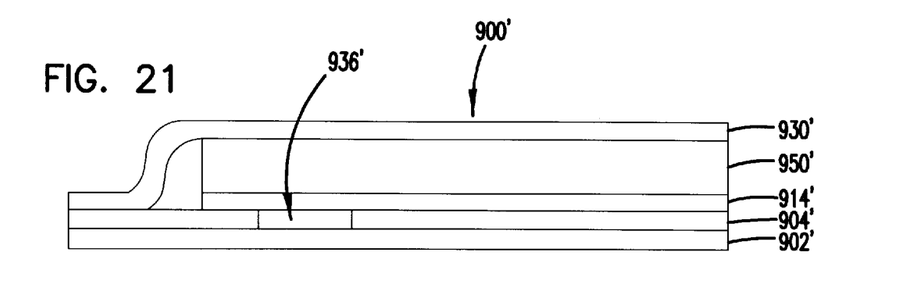
FIG. 21 is a cross-sectional view of a tenth embodiment of a filter, according to the invention.

An alternative embodiment of a filter 900' includes only an optional release liner 902, non-permeable mounting adhesive 904', filter media 914', porous layer 950', and cover layer 930', as illustrated in FIG. 21. This filter includes an inlet/outlet passageway 936' formed through the mounting adhesive 904' to allow air flow out of or into the filter media 914'.

Although specific examples of placement of the filters of the invention with respect to the interior or exterior of a housing are described above, it will be understood that any of these filters may be placed on the interior or exterior of a housing. For example, the placement of the filter may depend on whether the filtering activity is directed primarily to fluid flowing into the housing or fluid flowing out of the housing. Moreover, the placement of the filter may be such that the fluid flowing through the filter passes through the diffusion channel and then the filter media or, alternatively, through the filter media and then the diffusion channel.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A filter comprising:
    a channel layer film defining a channel;
    a boundary layer laminated to at least a portion of the channel layer and forming a non-adhesive boundary for the channel; and filter media disposed in fluid communication with the channel;

wherein the filter is configured and arranged for flow of at least a portion of a fluid along the channel and into the filter media.

2. The filter of claim 1, wherein the filter is configured and arranged for filtering air.

3. The filter of claim 1, wherein the filter media is mounted on the boundary layer and the boundary layer defines a passageway through the boundary layer to provide for flow of a least a portion of the fluid along the channel through the passageway and into the filter media.

4. The filter of claim 1, wherein the filter is mounted between the boundary layer and the channel layer film.

5. The filter of claim 1, further comprising lamination adhesive disposed between a portion of the channel layer film and a first portion of the boundary layer, but not over a second portion of the boundary layer that is exposed to the channel.

6. The filter of claim 1, wherein a lamination adhesive and a mounting adhesive are disposed on opposing surfaces of the channel layer film and wherein the channel is formed by removing a portion of the lamination adhesive, mounting adhesive and the channel layer film.

7. The filter of claim 1, wherein the filter media comprises a microporous membrane.

8. The filter of claim 7, wherein the microporous membrane comprises a polytetrafluoroethylene membrane.

9. The filter of claim 1, wherein the filter media comprises carbon filter material.

10. The filter of claim 1, wherein the boundary layer comprises a semipermeable film.

11. The filter of claim 1, wherein the boundary layer comprises a non-porous film.

12. The filter of claim 1, wherein the filter media comprises a porous support layer.

13. The filter of claim 1, wherein the channel extends to a sidewall of the polymer film to provide a side inlet into the channel when the filter is positioned on a surface.

14. The filter of claim 1, wherein the channel layer film has a passageway spaced apart from the channel and the filter is configured and arranged to provide for flow of at least a portion of a fluid along the diffusion channel, into the filter media, and through the passageway.

15. The filter of claim 14, wherein the passageway is also formed through the boundary layer.

16. The filter of claim 1, wherein the filter is configured and arranged to provide for flow of at least a portion of a fluid along the channel and through the filter media to exit the filter.

17. The filter of claim 1, wherein the boundary layer comprises a polymer or metal film.

18. The filter of claim 1, wherein the boundary layer comprises a cover layer with at least a portion of the cover layer mounted on the filter media.

19. The filter of claim 1, wherein the boundary layer comprises a surface of a device upon which the filter is mounted.

20. A filter comprising:

a channel layer film with mounting adhesive and lamination adhesive disposed on opposing sides of the channel layer film, the channel layer film, mounting adhesive, and lamination adhesive having a diffusion channel and a passageway formed therein, the diffusion channel and the passageway being spaced apart and the diffusion channel extending to a sidewall of the channel layer film to form an opening in the filter;

a boundary layer laminated to at least a portion of the channel layer film by the lamination adhesive, a portion of the boundary layer forming a non-adhesive boundary for the diffusion channel;

filter media mounted between the boundary layer and the channel layer film, in fluid communication with the diffusion channel, and over the passageway;

wherein the filter is configured and arranged for flow of fluid through the opening, along the diffusion channel, into the filter media, and through the passageway to exit the filter.

21. The filter of claim 20, wherein the boundary layer is non-porous.

22. The filter of claim 20, further comprising a porous layer mounted on the filter media and in fluid communication with the diffusion channel, the porous layer being configured and arranged for flow of at least a portion of fluid from the diffusion channel, through the porous layer, and into the filter media.

23. A device, comprising:

a housing;

a port in the housing; and a filter over the port, the filter including a channel layer film defining a channel;

a boundary layer laminated to at least a portion of the channel layer film and forming a non-adhesive boundary for the channel;

mounting adhesive disposed on an exterior surface of the filter for mounting the filter on the housing over the port; and filter media disposed in fluid communication with the channel;

wherein the filter is configured and arranged for flow of at least a portion of a fluid from the port, along the channel, and into the filter media.

24. A method for making a filter, comprising:

forming a channel in a channel layer film by removing a portion of the channel layer film;

disposing a filter layer in fluid communication with the channel; and laminating a boundary layer to the channel layer film, a portion of the boundary layer forming a non-adhesive boundary of the channel.

25. The method of claim 24, wherein forming a channel in the channel layer film comprises disposing mounting adhesive and lamination adhesive on opposing surfaces of the channel layer film and removing a portion of the channel layer film, mounting adhesive, and lamination adhesive.

26. The method of claim 24, wherein disposing the filter layer comprises mounting the filter layer on the boundary layer.

27. The method of claim 24, wherein disposing the filter layer comprises mounting the filter layer between the boundary layer and the channel layer film.

28. A filter comprising:

filter media;

mounting adhesive disposed on a first side of the filter media and having an opening to permit fluid flow through the filter media;

a porous layer mounted on an opposing second side of the filter media and extending to an edge of the filter; and a cover layer mounted over the porous layer and forming a boundary for fluid flowing through the porous layer;

wherein the filter is configured and arranged for flow of fluid from the opening in the mounting adhesive, through the filter media, into the porous layer, along the porous layer, and out through the edge of the filter.

29. The filter of claim 28, further comprising a polymer film between the filter media and the mounting adhesive and lamination adhesive between the polymer film and the filter media, the mounting adhesive, polymer film, and lamination adhesive having an opening to allow fluid into the filter media.

* * * * *